O. WEIS.
FILM SHIFTING MECHANISM FOR CAMERAS.
APPLICATION FILED AUG. 28, 1916.
1,274,283.
Patented July 30, 1918.
2 SHEETS—SHEET 1.
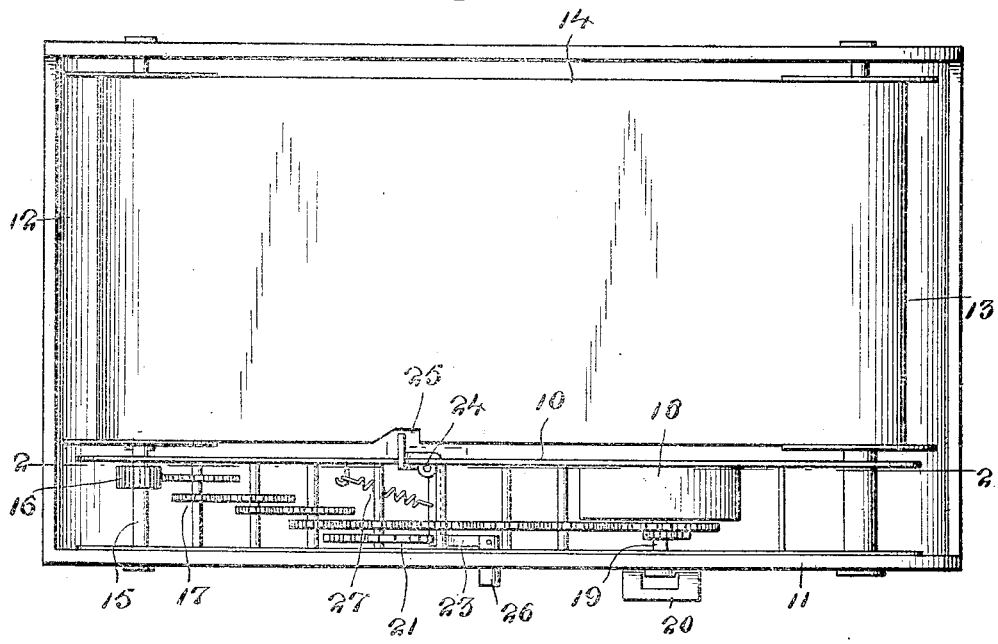
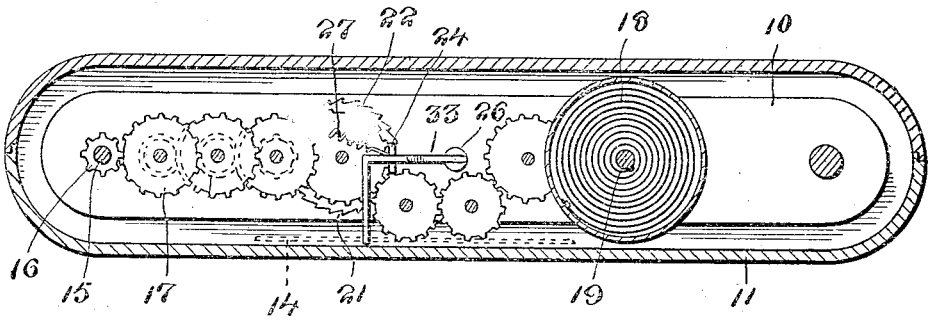
Inventor
Orville Weis
Witnesses
By Victor J. Evans
Attorney O. WEIS.
FILM SHIFTING MECHANISM FOR CAMERAS.
APPLICATION FILED AUG. 28, 1916.
1,274,223.
Patented July 30, 1918.
2 SHEETS—SHEET 2.
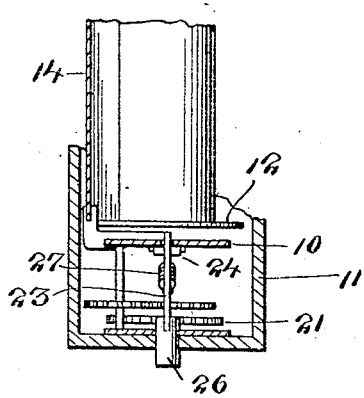
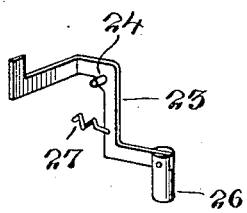
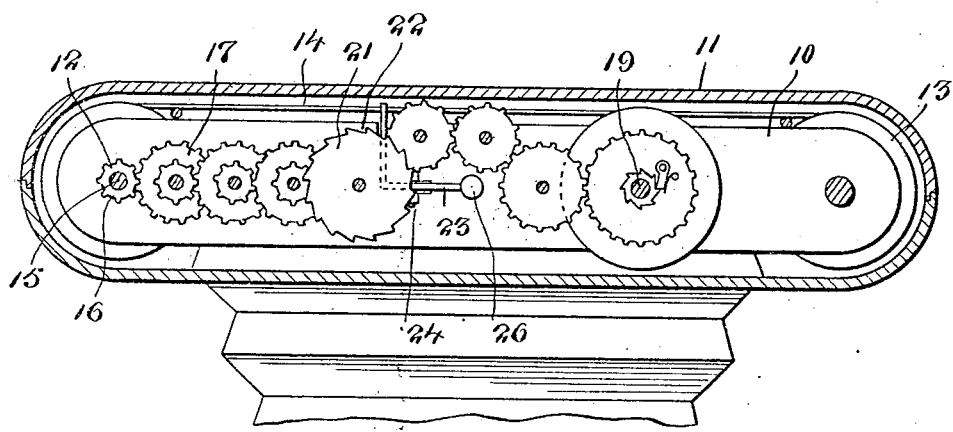
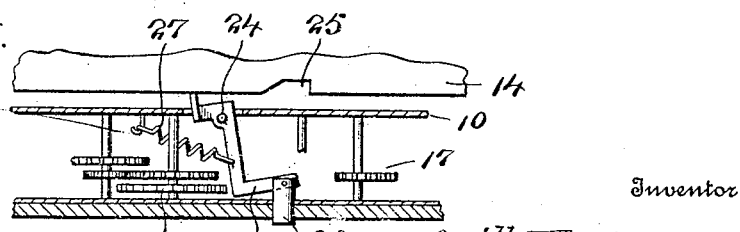

UNITED STATES PATENT OFFICE.

ORVILLE WEIS, OF THAYER, KANSAS.

FILM-SHIFTING MECHANISM FOR CAMERAS.

1,274,223.          Specification of Letters Patent.      Patented July 30, 1918.

Application filed August 28, 1916. Serial No. 117,344.

*To all whom it may concern:*

Be it known that I, ORVILLE WEIS, a citizen of the United States, residing at Thayer, in the county of Neosho and State of Kansas, have invented new and useful Improvements in Film-Shifting Mechanism for Cameras, of which the following is a specification.

The invention relates to a camera, and more particularly to the class of film feeding mechanism for cameras.

The primary object of the invention is the provision of mechanism of this character wherein the film to be exposed will be automatically fed for successive exposures after depressing an actuating button or the like, thereby eliminating the necessity of the manual rotation of the film for the feeding thereof after each exposure.

Another object of the invention is the provision of a mechanism for control by movement of the film so that the proper positioning of successive portions of the film for exposure will be assured and without the necessity of any attention on the part of the operator of the camera.

A further object of the invention is the provision of mechanism of this character which is extremely simple in construction, readily and easily applied to cameras of different makes, thoroughly reliable and efficient in operation, strong, durable and inexpensive of manufacture.

Other objects will be in part obvious and in part hereinafter set forth.

The invention accordingly consists in the features of construction, combination of elements and arrangement of parts which will be exemplified in the construction hereinafter described, and the scope of the application of which will be indicated in the appended claim.

In the accompanying drawings:

Figure 1 is a rear elevation of a camera showing the back thereof removed, with the feed mechanism constructed in accordance with the invention applied;

Fig. 2 is a sectional view on the line 2—2 of Fig. 1;

Fig. 3 is a vertical transverse sectional view;

Fig. 4 is a bottom plan view with the body of the camera broken away;

Fig. 5 is a fragmentary perspective view showing the control of the feed mechanism.

Fig. 6 is a detail longitudinal sectional view.

Similar reference characters indicate corresponding parts throughout the several views of the drawings.

Referring to the drawings in detail, the mechanism embodying the present invention is illustrated as arranged within a clock gear frame 10 which is fastened within the body 11 of a camera at the bottom thereof, and within this body are suitably mounted the spools 12 and 13 respectively, which are detachably supported therein, and one of which has normally wound thereon the film 14 while the other is adapted to take up the film by the winding of the same thereon when unwound from the other spool in the manner presently described.

The spool 12, which shall be designated the take up spool, has connection with a winding shaft which is formed with a pinion 16 and is supported in any suitable manner at one end of the frame 10, the pinion being in mesh with one of a train of gears 17 which are journaled in the frame 10 and operated through the medium of a key-winding coiled main spring 18 which is also arranged within the frame 10 and has its arbor 19 projected through the body 11 of the casing at its bottom for the mounting of the winding key 20 thereon which is readily accessible for the winding of the spring 18 when the occasion requires.

Operated by one of the gears 17 is an arbor upon which is mounted the ratchet wheel 21 which, in its periphery, is formed at intervals with notches 22, each of which is adapted to receive a pawl lever 23 pivoted at 24 in the frame 10, one end of the lever 23 being projected to enter in any one of the series of notches 25 formed in one edge of the film 14 adjacent said levers, while the other end of this lever 23 is located in the path of movement of the push button 26 which is slidably mounted in the bottom of the camera body 11 to be depressed by the operator of the camera to manipulate the lever 23 so as to disengage the same from any one of the notches 22 in the wheel 21 and also any one of the notches 25 in the film 14 to free the train of gearing 17 and said film for the automatic feeding thereof under the action of the spring 18 which drives the train of gearing to actuate the take up spool 12 for the winding of the film thereon and the unwinding of said film from the spool 13, as will be apparent.

Connected with the frame 10 and with the lever 23 is a coiled retractile spring 27 which is designed to move the lever into position for engagement in any one of the notches 22 and also in engagement with any one of the notches 25 so that the film 14 when automatically fed will be successively stopped and likewise the train of gears 17 held fastened and thereby stop the feeding of the film at proper points after a predetermined length of the film has been wound upon the spool so as to assure interim for successive exposures that the film in this manner will be properly positioned and intermittently moved for successive exposures thereof to be made by the camera, as usual, without necessitating the manual winding of the film in the usual manner, which results in the inaccurate setting of the film when making successive exposures in the taking of pictures.

The lever 23 is released when the button 26 is depressed by the operator of the camera and on the release of the lever the film is automatically fed in a manner hereinbefore set forth. The notches 25 in the film 14 assure the stopping of the film accurately at the required points for successive exposures to be made when the camera is operated.

From the foregoing description, taken in connection with the accompanying drawings, the construction and operation of the herein described camera attachment will be readily apparent and, therefore, a more extended explanation has been omitted.

Having thus described my invention, I claim:

In a camera, a film moving mechanism adapted to coöperate with a film notched at intervals along one of its edges, said mechanism including a ratchet wheel, a pawl pivoted in the camera and having the general form of a bell crank, one arm of the pawl being adapted to engage the ratchet wheel, a spring for normally holding the said arm in engagement with the wheel, said arm having an angularly disposed extremity, a button pivoted to said extremity, the other arm of the pawl having a laterally disposed portion and said portion having an angularly disposed extremity adapted to ride upon the edge of the film and enter the notches thereof.

In testimony whereof I affix my signature.

ORVILLE WEIS.

Copies of this patent may be obtained for five cents each, by addressing the "Commissioner of Patents, Washington, D. C."